US011307069B2

(12) United States Patent
Loos et al.

(10) Patent No.: US 11,307,069 B2
(45) Date of Patent: Apr. 19, 2022

(54) ULTRASONIC FLOW METER IN A BYPASS CHANNEL COUPLED IN PARALLEL WITH A FLOW TUBE

(71) Applicant: Woodward, Inc., Fort Collins, CO (US)

(72) Inventors: Jordan Loren Loos, Rockford, IL (US); Gregory Warren Pulley, Loveland, CO (US); Austin Wade Mueller, Clinton, WI (US); Michael L. Hahn, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 145 days.

(21) Appl. No.: 16/811,889

(22) Filed: Mar. 6, 2020

(65) Prior Publication Data

US 2021/0278262 A1 Sep. 9, 2021

(51) Int. Cl.
*G01F 1/66* (2022.01)
*G01F 1/44* (2006.01)

(52) U.S. Cl.
CPC . *G01F 1/66* (2013.01); *G01F 1/44* (2013.01)

(58) Field of Classification Search
None
See application file for complete search history.

(56) References Cited

U.S. PATENT DOCUMENTS

| | | |
|---|---|---|
| 3,925,692 A | 12/1975 | Leschek et al. |
| 4,345,657 A | 8/1982 | Mig |
| 5,464,039 A | 11/1995 | Bergamini |
| 5,750,892 A * | 5/1998 | Huang ............... G01F 1/40 73/202 |
| 6,005,395 A | 12/1999 | Chan et al. |
| 7,464,611 B2 * | 12/2008 | Matter ............... G01F 1/6842 73/861.52 |
| 7,600,417 B2 | 10/2009 | Paradise |

(Continued)

FOREIGN PATENT DOCUMENTS

| | | |
|---|---|---|
| CN | 205642485 | 10/2016 |
| DE | 3116333 | 11/1982 |

(Continued)

OTHER PUBLICATIONS

PCT International Search Report and Written Opinion in International Appln. No. PCT/US2021/021103, dated Jun. 16, 2021, 14 pages.

(Continued)

*Primary Examiner* — Harshad R Patel
(74) *Attorney, Agent, or Firm* — Fish & Richardson P.C.

(57) ABSTRACT

The subject matter of this specification can be embodied in, among other things, a fluid flow measurement apparatus includes an inlet configured to flow a dynamic fluid flow, an outlet configured to flow the dynamic fluid flow, a first fluid conduit fluidically connected between the inlet and the outlet, configured with a first predetermined geometry, and configured to flow a first portion of the dynamic fluid flow, a second fluid conduit fluidically connected between the inlet and the outlet, configured with a second predetermined geometry, and configured to flow a second portion of the dynamic fluid flow, and a first flow meter configured to measure the second portion of the dynamic fluid flow.

17 Claims, 7 Drawing Sheets

(56) References Cited

U.S. PATENT DOCUMENTS

| | | | |
|---|---|---|---|
| 7,954,387 B1 | 6/2011 | Furlong et al. | |
| 8,756,990 B2 * | 6/2014 | Speldrich | B29C 45/0025 |
| | | | 73/273 |
| 9,182,259 B2 | 11/2015 | Suzuki | |
| 9,239,337 B2 | 1/2016 | Mueller | |
| 9,261,389 B2 | 2/2016 | Gill | |
| 9,267,833 B2 | 2/2016 | Ohmiya | |
| 9,297,680 B2 | 3/2016 | Maruyama et al. | |
| 9,891,085 B2 | 2/2018 | Muhammad et al. | |
| 2004/0093957 A1 | 5/2004 | Buess | |
| 2005/0016281 A1 | 1/2005 | Hill et al. | |
| 2007/0227263 A1 | 10/2007 | Fukano | |
| 2007/0233412 A1 * | 10/2007 | Gotoh | G01F 1/6847 |
| | | | 702/50 |
| 2013/0205892 A1 * | 8/2013 | Ueda | G01F 1/6845 |
| | | | 73/202 |
| 2014/0198822 A1 | 7/2014 | Lei et al. | |
| 2014/0260513 A1 | 9/2014 | Smirnov et al. | |
| 2014/0260667 A1 * | 9/2014 | Berkcan | G01F 1/667 |
| | | | 73/861.28 |
| 2015/0013472 A1 | 1/2015 | Gill et al. | |
| 2015/0082913 A1 | 3/2015 | Maruyama et al. | |
| 2018/0306625 A1 | 10/2018 | Baker | |
| 2021/0164816 A1 | 6/2021 | Loos | |
| 2022/0034695 A1 | 2/2022 | Loos | |
| 2022/0042835 A1 | 2/2022 | Loos | |
| 2022/0042836 A1 | 2/2022 | Loos | |
| 2022/0043142 A1 | 2/2022 | Loos | |

FOREIGN PATENT DOCUMENTS

| | | |
|---|---|---|
| DE | 19710296 | 3/1998 |
| DE | 102014205042 | 9/2015 |
| DE | 102016105338 | 9/2017 |
| DE | 202017007116 | 8/2019 |
| EP | 0451355 | 10/1991 |
| EP | 0907069 | 4/1999 |
| EP | 1279368 | 1/2003 |
| EP | 2827111 | 1/2015 |
| EP | 3222980 | 9/2017 |
| JP | 2006337059 | 12/2006 |
| WO | WO9205042 | 4/1992 |
| WO | WO2009071746 | 6/2009 |
| WO | WO2021040540 | 3/2021 |
| WO | WO2021113444 | 6/2021 |

OTHER PUBLICATIONS

Hoche et al., "Ultrasound-Based Density Determination via Buffer Rod Techniques", J. Sens. Syst., 2013, 2:103-125.

Kazys et al., "Ultrasonic Technique for Density Measurement of Liquids in Extreme Conditions", Sensors, 2015, 15:19393-19415.

Nakamura, "Ultrasonic Transducers: Materials and Design for Sensors, Actuators and Medical Applications", Woodhead Publishing, 2012.

PCT Invitation toPay Additional Fees, and, Where Applicable, Protest Fee in International Appln. No. PCT/US2020/063013, dated Mar. 19, 2021, 16 pages.

PCT International Search Report and Written Opinion in International Appln. No. PCT/US2020/063013, dated May 11, 2021, 21 pages.

PCT International Search Report and Written Opinion in International Appln. No. PCT/US2021/045042, dated Nov. 19, 2021, 6 pages.

PCT International Search Report and Written Opinion in International Appln. No. PCT/US2021/045040, dated Nov. 16, 2021, 15 pages.

PCT International Search Report and Written Opinion in International Appln. No. PCT/US2021/045049, dated Nov. 16, 2021, 6 pages.

PCT Invitation to Pay Additional Fees, and, Where Applicable, Protest Fee in International Appln. No. PCT/US2021/045047, dated Nov. 19, 2021, 14 pages.

Puttmer et al., "Ultrasonic Density Sensor for Liquids", IEEE Transactions on Ultrasonics, Ferroelectrics, and Frequency Control, Jan. 2000, 47(1):85-92.

PCT International Preliminary Report on Patentability in International Appln. No. PCT/US2020/063013, dated Feb. 21, 2022, 28 pages.

* cited by examiner

ULTRASONIC FLOW METER IN A BYPASS CHANNEL COUPLED IN PARALLEL WITH A FLOW TUBE

TECHNICAL FIELD

This instant specification relates to ultrasonic fluid mass flow and volumetric flow sensors.

BACKGROUND

Fluid measurement devices are used for the characterization and operation of fluid control systems. As the dynamic bandwidths, flow ranges, accuracies, and reliabilities of flow measurement devices improve, the potential application landscape of such devices broadens. High dynamic bandwidth flow meters can be used as control system feedback sensors for improving steady state and/or transient accuracy in fuel systems. Ultrasonic flow meters (USFM) are a proven industrial technology that can be leveraged for implementation to aircraft turbine systems.

Due to low velocities and time of flight restraints, use of a single flow meter design may not always be practical or perform accurately over the full range. In previous designs, various ultrasonic flow meters are used in order to cover a broad range of fuel flow. In aircraft turbine systems for example, maximum fuel flow on a large engine application could be about 50 times greater (or more) than for a small engine. Additionally, some engine applications can require a fuel turn down ratio for operation between minimum and maximum fuel flow that covers the required fuel flow from engine light off to takeoff, and this can represent about a 1000:1 turndown ratio across various fuel control product portfolios.

In existing designs, dual channel redundancy has been achieved by packaging four piezo transducers in a single flow channel. These are arranged at an angle to the flow path such that the acoustic signals are independent of each other. This arrangement does not allow for the full cross section of the flow path to be sonified, which introduces errors in signal measurement and limits the turn down ratio of the device. Such designs also do not propagate the acoustic wave coincident with the flow path.

SUMMARY

In general, this document describes ultrasonic fluid mass flow sensors.

In an example aspect, a fluid flow measurement apparatus includes an inlet configured to flow a dynamic fluid flow, an outlet configured to flow the dynamic fluid flow, a first fluid conduit fluidically connected between the inlet and the outlet, configured with a first predetermined geometry, and configured to flow a first portion of the dynamic fluid flow, a second fluid conduit fluidically connected between the inlet and the outlet, configured with a second predetermined geometry, and configured to flow a second portion of the dynamic fluid flow, and a first flow meter configured to measure the second portion of the dynamic fluid flow.

Various embodiments can include some, all, or none of the following features. The first flow meter can be a transit-time type ultrasonic flow meter. The second fluid conduit can be configured as a venturi flow tube. The fluid flow measurement apparatus can also include an electronic circuit configured to determine at least one of a dynamic fluid flow volume or a dynamic fluid flow rate of the dynamic fluid flow based on a measurement of the second portion of the dynamic fluid flow, the first predetermined geometry, and the second predetermined geometry. The first predetermined geometry can be substantially the second predetermined geometry. The first fluid conduit can include a collection of fluidically parallel additional fluid conduits each configured with a third predetermined geometry. The third predetermined geometry can be substantially the second predetermined geometry. The fluid flow measurement apparatus can also include a third fluid conduit fluidically connected between the inlet and the outlet, configured with a third predetermined geometry, and configured to flow a third portion of the dynamic fluid flow, and a second flow meter configured to measure the third portion of the dynamic fluid flow. The fluid flow measurement apparatus can also include an electronic circuit configured to determine at least one of a dynamic fluid flow volume or a dynamic fluid flow rate of the dynamic fluid flow based on a measurement of the third portion of the dynamic fluid flow, the first predetermined geometry, the second predetermined geometry, and the third predetermined geometry. The third predetermined geometry can be substantially the second predetermined geometry. The fluid flow measurement apparatus can also include a second flow meter configured to measure the second portion of the dynamic fluid flow in a first portion of the second fluid conduit, where the first flow meter is configured to measure the second portion of the dynamic fluid flow in a second portion of the second fluid conduit apart from the first portion of the second fluid conduit. The fluid flow measurement apparatus can also include a fluid interconnection that is non-coaxial to at least one of the first portion of the second fluid conduit and the second portion of the second fluid conduit.

In another example aspect, a method of sensing flow includes receiving a dynamic fluid flow at an inlet, flowing a first portion of the dynamic fluid flow through a first fluid conduit configured with a first predetermined geometry and fluidically connected between the inlet and an outlet, flowing a second portion of the dynamic fluid flow through a second fluid conduit configured with a second predetermined geometry and fluidically connected between the inlet and an outlet, flowing the second portion of the dynamic fluid flow through a first flow meter arranged along the second fluid conduit, measuring, by the first flow meter, the second portion of the dynamic fluid flow, and determining, based on the measuring, the dynamic fluid flow.

Various implementations can include some, all, or none of the following features. Determining, based on the measuring, the dynamic fluid flow can include determining at least one of a dynamic fluid flow volume or a dynamic fluid flow rate of the dynamic fluid flow based on the measuring of the second portion of the dynamic fluid flow, the first predetermined geometry, and the second predetermined geometry. The first predetermined geometry can be substantially the second predetermined geometry, and the second portion of the dynamic fluid flow can be substantially equal to the first portion of the dynamic fluid flow. The first fluid conduit can include a collection of fluidically parallel additional fluid conduits each configured with a third predetermined geometry and fluidically connected between the inlet and the outlet, wherein flowing the second portion of the dynamic fluid flow through the second fluid conduit can also include flowing the second portion of the dynamic fluid flow as a collection of third portions of the dynamic fluid flow through the collection of fluidically parallel additional fluid conduits. The third predetermined geometry can be substantially the second predetermined geometry. The method can also include flowing a third portion of the dynamic fluid flow through a third fluid conduit configured with a third predetermined geometry and fluidically connected between the inlet and the outlet, flowing the third portion of the dynamic fluid flow through a second flow meter arranged along the third fluid conduit, and measuring, by the second flow meter, the third portion of the dynamic fluid flow. Determining, based on the measuring, the dynamic fluid flow can include determining at least one of a dynamic fluid flow volume or a dynamic fluid flow rate of the dynamic fluid flow based on the measuring of the second portion of the dynamic fluid flow, the measuring of the third portion of the dynamic fluid flow, the first predetermined geometry, the second predetermined geometry, and the third predetermined geometry. The third predetermined geometry can be substantially the second predetermined geometry. The method can also include flowing the second portion of the dynamic fluid flow through a second flow meter arranged along the second fluid conduit, and measuring, by the second flow meter, the second portion of the dynamic fluid flow, where determining, based on the measuring, the dynamic fluid flow can also include determining the dynamic fluid flow based on the measuring by the first flow meter and the second flow meter. The first fluid conduit can define a first fluid flow path, and flowing the second portion of the dynamic fluid flow through the second fluid conduit can also include flowing the second portion of the dynamic fluid flow along a second fluid flow path that is non-coaxial to the first fluid flow path, wherein the first portion of the second fluid conduit is non-coaxial to the second portion of the second fluid conduit.

In another example aspect, a method of sensing flow includes receiving a first collection of information descriptive of a first geometry of a first fluid conduit, receiving a second collection of information descriptive of a second geometry of a second fluid conduit, where the first fluid conduit and the second fluid conduit together flow a total dynamic fluid flow path, receiving a third collection of information descriptive of a partial dynamic fluid flow through the second fluid conduit, and determining a total dynamic fluid flow based on the first collection of information, the second collection of information, and the third collection of information.

Various implementations can include some, all, or none of the following features. The first fluid conduit can include a collection of fluidically parallel additional fluid conduits each configured with substantially the second geometry, where the partial dynamic fluid flow through the second fluid conduit is substantially the same as other partial dynamic fluid flows in each of the collection of fluidically parallel additional fluid conduits.

The systems and techniques described here may provide one or more of the following advantages. First, a system can provide accurate measurements of dynamically changing fluid flows while still satisfying total fluid flow demands. Second, the system can enable the use of a particular sensor configuration with a variety of different fluid flow scenarios. Third, the system can provide improved accuracy and reliability through sensor redundancy.

The details of one or more implementations are set forth in the accompanying drawings and the description below. Other features and advantages will be apparent from the description and drawings, and from the claims.

DETAILED DESCRIPTION

This document describes ultrasonic fluid mass flow sensor systems that implement ultrasonic flowmeters (USFM), and techniques for measuring fluid flow characteristics of fluids. USFMs are currently utilized in the racing industry, custody transfer, home water flow measurement, and many other applications. Various ultra-sonic flow meters are designed to cover a broad range of fuel flow. In aircraft turbine systems for example, max fuel flow on a large engine application could be about 50 times greater than a small engine application or more (e.g., about 600 pounds per hour (pph) for some small engine applications and about 50000 pph for some large engine applications). It is therefore desirable to have a reusable (e.g., universal, modular) platform ultrasonic flow tube, in which a single or reduced number of tube configurations could be used in various applications. This document describes several possible example embodiments of solutions to this problem, through the use of various predetermined arrangements of flow tubes and/or venturi tubes in combination with USFMs.

Figure 1:
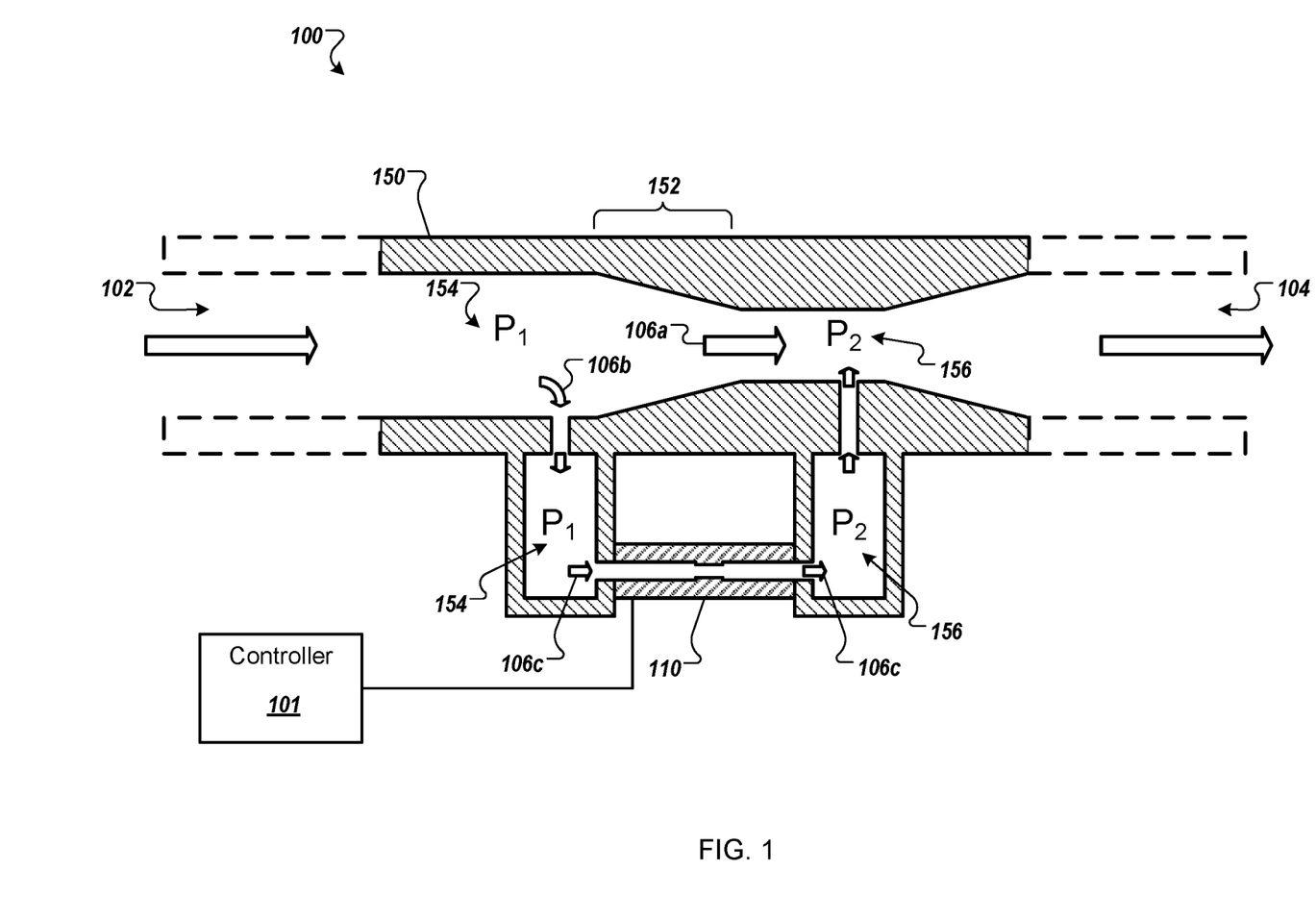
FIG. 1 is a cross-sectional view of an example ultrasonic mass flow sensor system, in accordance with some embodiments described in this document.

FIG. 1 is a cross-sectional view of an example ultrasonic mass flow sensor system 100. The system 100 is a fluid flow measurement apparatus that includes an ultrasonic flow meter (USFM) 110 fluidically coupled in parallel with a venturi tube 150. A controller 101 (e.g., a processor, electronic circuit) is configured to receive and process flow signals from the USFM 110.

Fluid (e.g., fuel) enters the system 100 at an inlet 102, and exits at an outlet 104. A portion of the fluid flows through the venturi tube 150 (represented by arrow 106a), while another portion of the fluid flows through the USFM 110 (represented by arrow 106b). The venturi tube 150 includes a neck 152, in which the cross-sectional flow area of the venturi tube 150 is reduced. The USFM 110 has its own, separate cross-sectional flow area.

The flow restriction provided by the neck 152 creates a fluid pressure difference between the upstream and downstream sides of the neck 152. On the upstream side, a region of relatively higher pressure fluid 154 (identified as $P_1$) is developed. On the downstream side, a region of relatively lower pressure fluid 156 (identified as $P_2$) is developed. The region 154 extends to an inlet 102 of the USFM 110, and the region 156 extends to an outlet 104 of the USFM 110. The pressure differential between the inlet 102 and the outlet 104 urges a fluid flow (represented by arrows 106c) through the USFM 110. The amount of fluid passing through the USFM 110 is proportional to the differences in area between the venturi tube 150 and the USFM 110.

In some embodiments, the system 100 can allow for an ultra-sonic flow meter that could be used in a broad range of fuel flow applications. In order to use the same USFM 110 across a larger flow range, the geometry of the venturi tube 150 can be modified to accommodate a wide range of fuel flow rates while leaving the USFM 110 substantially unchanged (e.g., the USFM 110 could be used universally with a variety of different venturi designs configured for different flow ranges). For example, the cross-sectional flow area of the venturi tube 150 can be increased in order to accommodate a relatively larger fuel flow while maintaining the same fluid flow range of the USFM 110. In another example, the cross-sectional flow area of the venturi tube 150 can be reduced to accommodate a relatively smaller fluid flow while maintaining the same fuel flow range of the USFM 110. Through implementation of this method, a single design configuration of the USFM 110 can be extended across a broader fluid flow range without requiring redevelopment or redesign of the USFM 110.

In some embodiments, in order to use the same venturi tube 150 across a wider range of applications, the USFM 110 can be modified or replaced while leaving the venturi tube 150 substantially unchanged (e.g., the venturi tube 150 could be used universally with a variety of different USFM designs configured for different flow ranges or sensitivities). For example, the venturi tube 150 may be configured for a particular flow, but the USFM 110 could be replaced (e.g., for maintenance) or replaced with another USFM having a different cross-sectional flow area and/or length (e.g., to accommodate fluids of different viscosities, to alter the sensitivity, bandwidth, or dynamic responsiveness of the sensor).

In general, an ultrasonic flow meter coupled with dynamically balanced flow tubes can allow for a single ultra-sonic sensor that could be implemented in a broad range of fluid flow applications. While each application may benefit from some fine tuning and characterization, the sensor, electronics, and basic architecture would be a design (e.g., a "universal" design) that could be shared or reused among multiple applications of different fluid flow ranges. Referring to FIG. 1, the fluid passing through the USFM 110 is substantially ratiometric of the total dynamic flow from $P_1$ to $P_2$. To increase the flow range of the USFM 110, additional flow passages can be added. Through implementation of such a configuration, a single USFM design can be extended across a broader fluid flow range without redevelopment of the USFM. An example of such a design is discussed in the description of FIGS. 2A-2C.

Figure 2A:
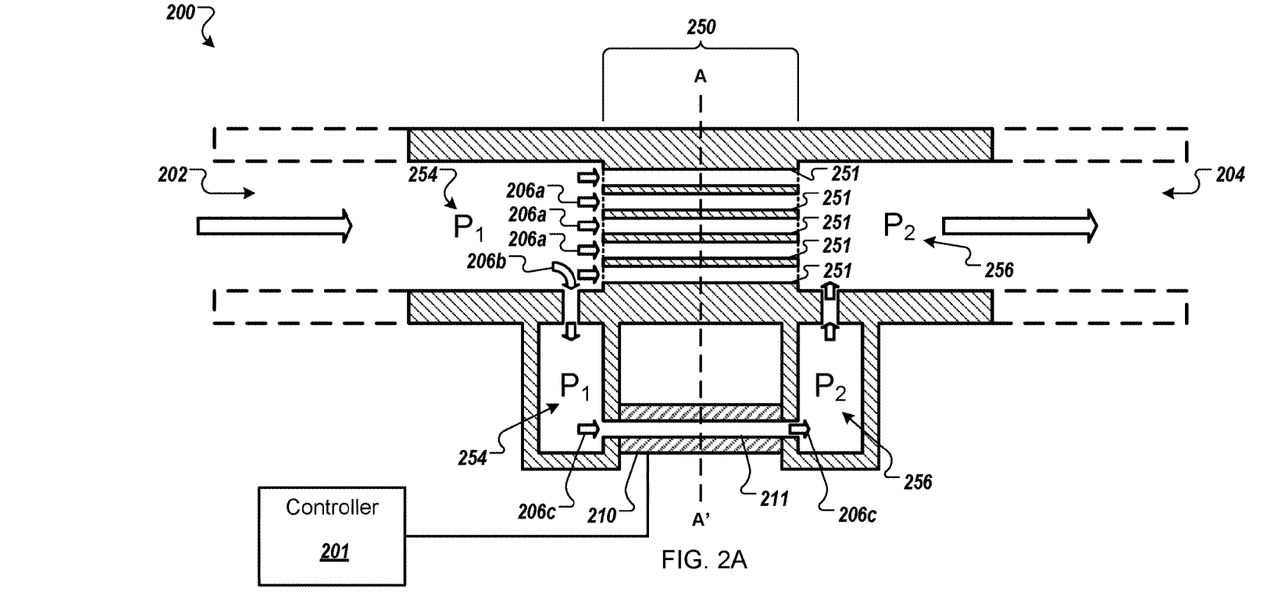
FIGS. 2A-2C are cross-sectional views of another example ultrasonic mass flow sensor system, in accordance with some embodiments described in this document.
Figure 2B:
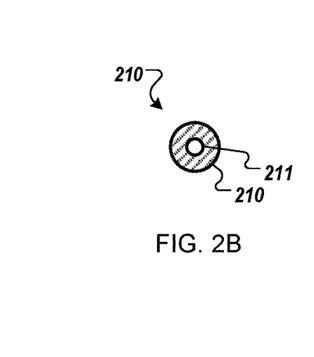
Figure 2C:
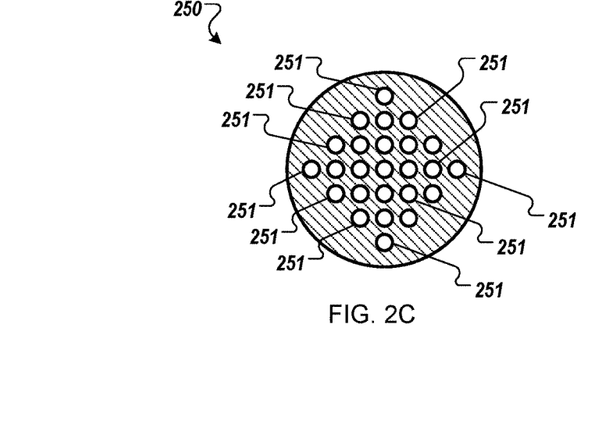

FIGS. 2A-2C are cross-sectional views of another example ultrasonic mass flow sensor system 200, in accordance with some embodiments described in this document. In some embodiments, the system 200 can be a modification of the example system 100 of FIG. 1. In some embodiments, various features of the system 100 and 200 can be combined.

The system 200 is a fluid flow measurement apparatus that implements an example configuration in which a single flow meter design can be used across a wide range of fluid flow rate applications. The system 200 includes an ultrasonic flow meter (USFM) 210 fluidically coupled in parallel with a primary flow assembly 250. A controller 201 is configured to receive flow measurement signals from the USFM 210.

Referring to FIG. 2B, which shows a cross sectional view of the USFM 210 across the section A-A' of FIG. 2A, the USFM has a fluid conduit 211. The fluid conduit 211 has a predetermined cross sectional flow area.

Referring now to FIG. 2C, which shows a cross sectional view of the primary flow assembly 250 across section A-A' of FIG. 2A, the primary flow assembly 250 includes a collection of fluid conduits 251 (e.g., a collection of venturi tubes, concentric conduits, or other flowable geometric conduits). Each of the fluid conduits 251 has a predetermined cross sectional flow area (e.g., the fluid conduits 251 can be dynamically matched fluid conduits). In the illustrated example, the cross-sectional flow area of each of the fluid conduits 251 is the same as the cross-sectional flow area of the fluid conduit 211, however in other examples any appropriate predetermined cross-sectional area or areas, or any appropriate other predetermined combination of geometries (e.g., cross-sectional shapes, lengths, straight or shaped) can be used.

Fluid (e.g., fuel) enters the system 200 at an inlet 202, and exits at an outlet 204. Multiple portions of the fluid flow through the fluid conduits 251 (represented by arrows 206a), while another portion of the fluid flows through the USFM 210 (represented by arrow 206b).

The flow restriction provided by the assembly 250 creates a fluid pressure difference between the upstream and downstream sides of the assembly 250. On the upstream side, a region of relatively higher pressure fluid 254 (identified as $P_1$) is developed. On the downstream side, a region of relatively lower pressure fluid 256 (identified as $P_2$) is developed. The region 254 extends to an inlet 202 of the USFM 210, and the region 256 extends to an outlet 204 of the USFM 210. The pressure differential between the inlet 202 and the outlet 204 urges a fluid flow (represented by arrows 206c) through the USFM 210. The amount of fluid passing through the USFM 210 is proportional to the differences in areas between the fluid conduits 251 and the USFM 210. In some embodiments, the fluid flow of each of the fluid conduits 251 is substantially equal to each other, and/or to the USFM 210. In some embodiments, the collection of fluid conduits 251 and/or the USFM 210 can be configured with a predetermined geometry or geometries that can dynamically balance (e.g., split, divide) the fluid flows through the USFM 210 and the collection of fluid conduits 251.

In some embodiments, the system 200 can allow for an ultra-sonic flow meter that could be used in a broad range of fuel flow applications. In order to use the same USFM 210 across a larger flow range, the geometries and/or quantity of the fluid conduits 251 can be modified to accommodate a wide range of fluid flow rates while leaving the USFM 210 substantially unchanged (e.g., the USFM 210 could be used universally with a variety of different designs of the primary flow assembly 250 configured for different flow ranges).

For example, the number of fluid conduits 251 in the primary flow assembly 250 can be increased in order to accommodate a relatively larger fuel flow while maintaining the same fluid flow range of the USFM 210. In another example, the number of the fluid conduits 251 can be reduced to accommodate a relatively smaller fluid flow while maintaining the same fuel flow range of the USFM 210. Through implementation of this method, a single design configuration of the USFM 210 can be extended across a broader fluid flow range without requiring redevelopment or redesign of the USFM 210.

In another example, the fluid conduit 211 can be configured to sense a low end of an expected flow range. As flow requirements increase, additional fluid conduits 251 can be added in parallel with the USFM 210. The flow in each of the fluid conduits 251 and the fluid conduit 211 (e.g., the flow sensing passage), can be ratiometric of the total dynamic flow.

By implementing the multiple fluid conduits 251 in the primary flow assembly 250, not only can the system 200 be made capable of flowing a predetermined amount of fluid, the system 200 can provide sensitivity to dynamic changes in flow (e.g., bandwidth) not provided by previous designs.

In typical (e.g., fluid dynamics textbook) fluid circuit designs, it is known that a fluid flow divided through two parallel conduits will be proportional to each other even when one of the parallel conduits (e.g., a primary fluid path large enough to satisfy a required flow) is larger than the other (e.g., a flowmeter fluid path small enough to allow the flowmeter to function within a predetermined set of design parameters). However, such examples generally only hold true for steady flow states. During dynamic changes in flow rates across such parallel paths, and/or during dynamic changes in the pressure differential across such parallel paths, the parallel flow rates may not be entirely proportional until flows and pressures across the assembly re-stabilize. During such dynamic changes, the flow through the relatively smaller flowable area of a USFM may not accurately represent the flow through the relatively larger flowable area of a primary fluid path. In general, the more restrictive flow path through a USFM in previous designs will have a lower dynamic sensitivity than a larger primary parallel flow path.

The system 200 improves the ability of the USFM 210 to accurately sense the dynamic fluid flow characteristics of the primary fluid flow by implementing the multiple fluid conduits 251 to convey the primary flow (e.g., instead of using a single, large conduit). In embodiments in which the geometries of the multiple fluid conduits 251 and the fluid conduit 211 are substantially the same, the dynamic behavior of fluid flowing though the fluid conduit 211 will be substantially representative of the dynamic behavior of fluid flowing through each of the multiple fluid conduits 251. In embodiments in which the geometries of the multiple fluid conduits 251 is predetermined but not necessarily the same as the geometry of the fluid conduit 211, the dynamic behavior of the fluid flowing through the fluid conduit will be proportionally representative of the dynamic behavior of fluid flowing through each of the multiple fluid conduits 251. In such examples, the differences in dynamic behaviors can be at least partly offset based on knowledge of the predetermined geometries of the fluid conduit 211 and the multiple fluid conduits 251. As such, the geometries of the fluid conduit 211 and the multiple fluid conduits 251 can be configured for any appropriate fluid flow range and measurement tolerance.

Figure 3:
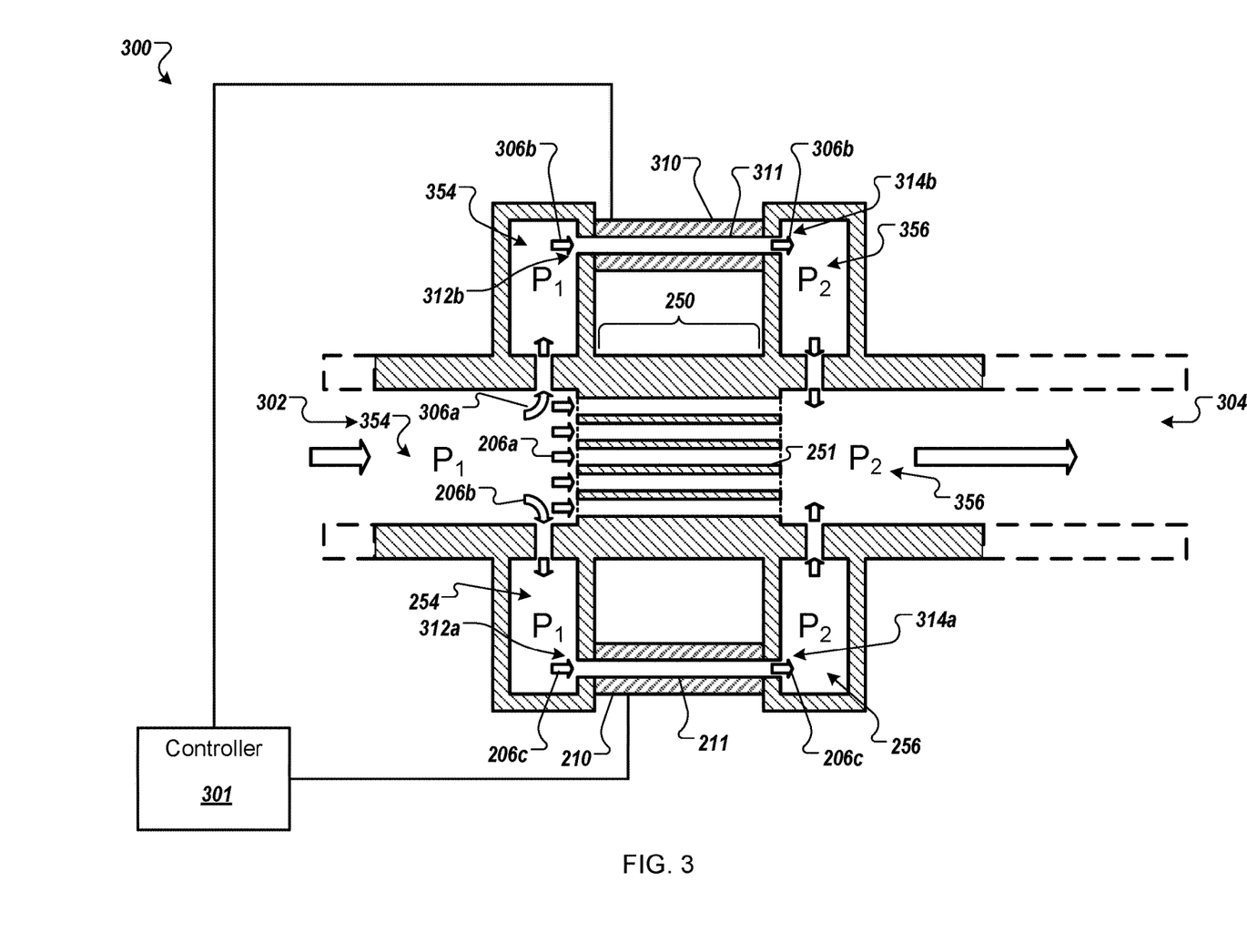
FIG. 3 is a cross-sectional view of another example ultrasonic mass flow sensor system, in accordance with some embodiments described in this document.

FIG. 3 is a cross-sectional view of another example ultrasonic mass flow sensor system 300, in accordance with some embodiments described in this document. In some embodiments, the system 300 can be a modification of the example system 200 of FIGS. 2A-2C. In some embodiments, various features of the systems 100, 200, and 300 can be combined.

The system 300 is a fluid flow measurement apparatus that implements an example configuration in which a dual flow meter design can be used across a wide range of fluid flow rate applications. The system 300 includes the ultrasonic flow meter (USFM) 210 fluidically coupled in parallel with the primary flow assembly 250. The system 300 also includes a USFM 310 fluidically coupled in parallel with the primary flow assembly 250 and the USFM 210. A controller 301 is configured to receive and process fluid flow signals from the USFM 210 and 310.

Fluid (e.g., fuel) enters the system 300 at an inlet 302, and exits at an outlet 304. Multiple portions of the fluid flow through the fluid conduits 251 (represented by arrows 206a), while another portion of the fluid flows through the USFM 210 (represented by arrow 206b), and another portion of the fluid flows through a USFM 310 (represented by arrow 306a).

The flow restriction provided by the assembly 250 creates a fluid pressure difference between the upstream and downstream sides of the assembly 250. On the upstream side, a region of relatively higher pressure fluid 354 (identified as $P_1$) is developed. On the downstream side, a region of relatively lower pressure fluid 356 (identified as $P_2$) is developed. The region 354 extends to an inlet 312a of the USFM 210 and an inlet 312b of the USFM 310, and the region 356 extends to an outlet 314a of the USFM 210 and an outlet 314b of the USFM 310. The pressure differential between the inlet 312a, 312b and the outlet 314a, 314b urges fluid flows (represented by arrows 206c and 306b) through the USFM 210 and the USFM 310. The amount of fluid passing through the USFMs 210 and 310 is proportional to the differences in areas between the fluid conduits 251 and the USFMs 210 and 310. Furthermore, the amount of fluid passing through the USFM 210 is proportional to the amount of fluid passing through the USFM 310 (e.g., if the geometries and configurations of the USFM 210 and the USFM 310 are substantially identical, then the readings they provide will be substantially identical as well).

In some embodiments, the presence of two or more parallel USFMs can improve the robustness and/or accuracy of a flow measurement system. For example, a controller can compare the sensed feedback provided by the USFM 210 and the USFM 310 to provide an averaged reading. In another example, a controller can compare the sensed feedback provided by the USFM 210 and the USFM 310 to identify a failure of one of the USFMs 210, 310 (e.g., one reading varies while the other does not, when the two readings diverge beyond a predetermined threshold, either of the readings varies beyond a predetermined threshold difference when compared to an estimated expected reading based on current operating conditions).

Although the illustrated example shows two USFMs, the USFM 210 and the USFM 310, additional USFMs can be added in a similar parallel arrangement. For example, with three or more USFMs in use, a controller can compare the various readings to determine which readings appear to substantially agree and which readings do not. The controller can then provide a value based on the readings provided by the greatest number USFMs that have substantially similar readings (e.g., a voting technique) as a reliable measurement value. Similarly, the controller can compare the readings of multiple USFMs to identify USFMs that may be malfunctioning, and ignore them for operational use and/or identify them for maintenance or replacement.

Figure 4:
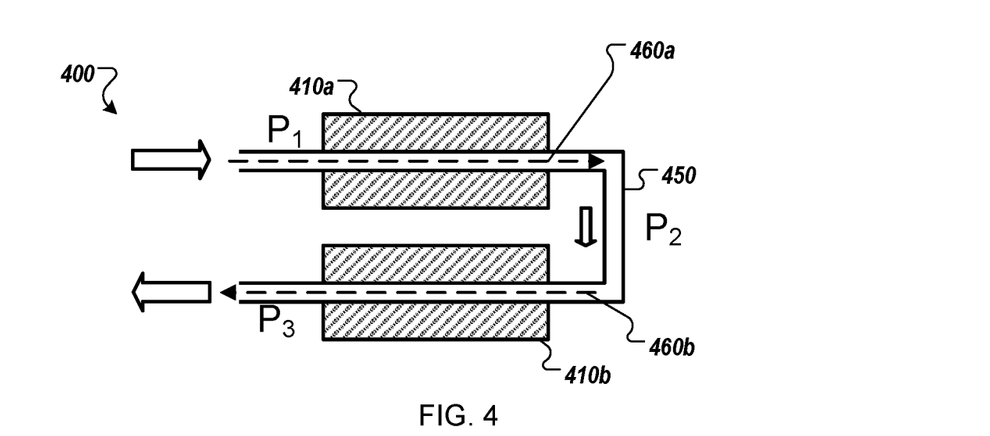
FIG. 4 is a cross-sectional view of an example arrangement of ultrasonic flowmeters, in accordance with some embodiments described in this document.

FIG. 4 is a cross-sectional view of an example arrangement 400 of ultrasonic flowmeters, in accordance with some embodiments described in this document. In some embodiments, the arrangement 400 can be used in place of the example USFMs 110, 210, and/or 310 of FIGS. 1-3.

The arrangement 400 includes a USFM 410a and a USFM 410b fluidically connected in series by a conduit 450. A fluid flow enters the USFM 410a and is sonified by the USFM 410a. The sonification propagates along a path 460a that is substantially parallel to the direction of fluid flow through the USFM 410a. The fluid then flows through the conduit 450 to the USFM 410b and is sonified again by the USFM 410b. The sonification propagates along a path 460b that is substantially parallel to the direction of fluid flow through the USFM 410b.

In some implementations, the arrangement 400 can provide a redundant configuration of USFMs. For example, a controller can compare the readings of the USFM 410a and the USFM 410b to perform averaging and/or to detect a difference that may be indicative of a malfunction of one or both of the USFMs 410a and 410b.

In order to prevent cross-propagation of sonification pulses from one of the USFMs 410a, 410b to the other (e.g., which may cause signal crosstalk, noise, or otherwise affect the measurements), the arrangement 400 is configured such that the USFM 410a is non-coaxial relative to the USFM 410b. In the illustrated example, the path 460a is offset and reversed relative to the path 460b. A signal injected into the fluid by the USFM 410a propagates along the path 460a until it encounters the conduit 450. A substantial amount of the signal is attenuated by this junction, which reduces or substantially eliminates stray sonification signals from affecting the operations or the USFM 410b. Similarly, the arrangement 400 prevents sonification by the USFM 410b from affecting the operations of the USFM 410a.

Figure 5:
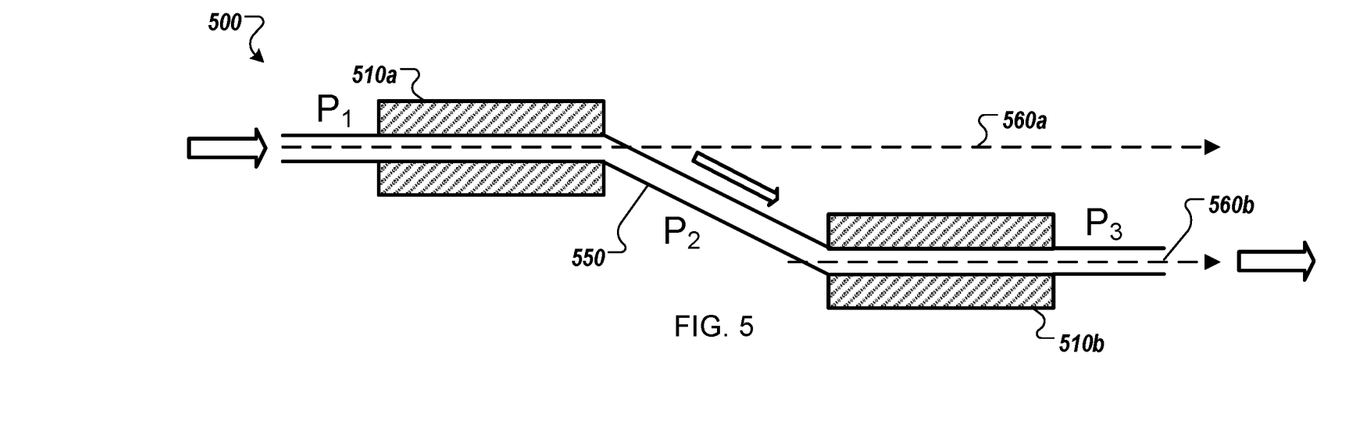
FIG. 5 is a cross-sectional view of another example arrangement of ultrasonic flowmeters, in accordance with some embodiments described in this document.

FIG. 5 is a cross-sectional view of an example arrangement 500 of ultrasonic flowmeters, in accordance with some embodiments described in this document. In some embodiments, the arrangement 500 can be used in place of the example USFMs 110, 210, and/or 310 of FIGS. 1-3.

The arrangement 500 includes a USFM 510a and a USFM 510b fluidically connected in series by a conduit 550. A fluid flow enters the USFM 510a and is sonified by the USFM 510a. The sonification propagates along a path 560a that is substantially parallel to the direction of fluid flow through the USFM 510a. The fluid then flows through the conduit 550 to the USFM 510b and is sonified again by the USFM 510b. The sonification propagates along a path 560b that is substantially parallel to the direction of fluid flow through the USFM 510b.

In some implementations, the arrangement 500 can provide a redundant configuration of USFMs. For example, a controller can compare the readings of the USFM 510a and the USFM 510b to perform averaging and/or to detect a difference that may be indicative of a malfunction of one or both of the USFMs 510a and 510b.

In order to prevent cross-propagation of sonification pulses from one of the USFMs 510a, 510b to the other (e.g., which may cause signal crosstalk, noise, or otherwise affect the measurements), the arrangement 500 is configured such that the USFM 510a is non-coaxial relative to the USFM 510b. In the illustrated example, the path 560a is offset yet substantially parallel to the path 560b. A signal injected into the fluid by the USFM 510a propagates along the path 560a until it encounters the conduit 550. A substantial amount of the signal is attenuated by this junction, which reduces or substantially eliminates stray sonification signals from affecting the operations or the USFM 510b. Similarly, the arrangement 500 prevents sonification by the USFM 510b from affecting the operations of the USFM 510a.

Figure 6:
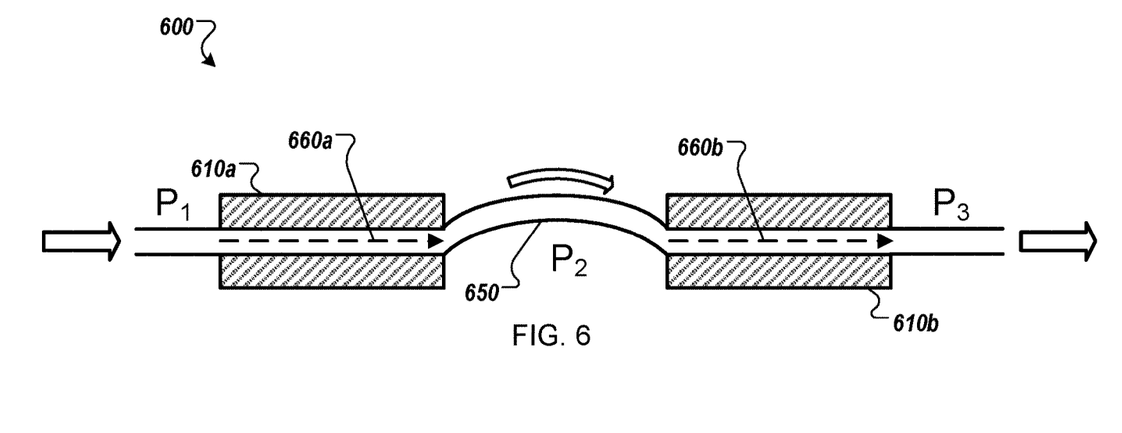
FIG. 6 is a cross-sectional view of another example arrangement of ultrasonic flowmeters, in accordance with some embodiments described in this document.

FIG. 6 is a cross-sectional view of an example arrangement 600 of ultrasonic flowmeters, in accordance with some embodiments described in this document. In some embodiments, the arrangement 600 can be used in place of the example USFMs 110, 210, and/or 310 of FIGS. 1-3.

The arrangement 600 includes a USFM 610a and a USFM 610b fluidically connected in series by a conduit 650 that is curved or otherwise nonlinear. A fluid flow enters the USFM 610a and is sonified by the USFM 610a. The sonification propagates along a path 660a that is substantially parallel to the direction of fluid flow through the USFM 610a. The fluid then flows through the curvature of the conduit 650 to the USFM 610b and is sonified again by the USFM 610b. The sonification propagates along a path 660b that is substantially parallel to the direction of fluid flow through the USFM 610b.

In some implementations, the arrangement 600 can provide a redundant configuration of USFMs. For example, a controller can compare the readings of the USFM 610a and the USFM 610b to perform averaging and/or to detect a difference that may be indicative of a malfunction of one or both of the USFMs 610a and 610b.

In order to prevent cross-propagation of sonification pulses from one of the USFMs 610a, 610b to the other (e.g., which may cause signal crosstalk, noise, or otherwise affect the measurements), the arrangement 600 is configured such that the path 660a is non-coaxial relative to the path 660b. In the illustrated example, the path 660a is aligned to the path 660b, however, the conduit 650 does not provide a direct, coaxial path between the two USFMs 610a, 610b. A signal injected into the fluid by the USFM 610a propagates along the path 660a until it encounters the conduit 650. A substantial amount of the signal is attenuated by this junction, which reduces or substantially eliminates stray sonification signals from affecting the operations or the USFM 610b. Similarly, the arrangement 600 prevents sonification by the USFM 610b from affecting the operations of the USFM 610a.

Figure 7:
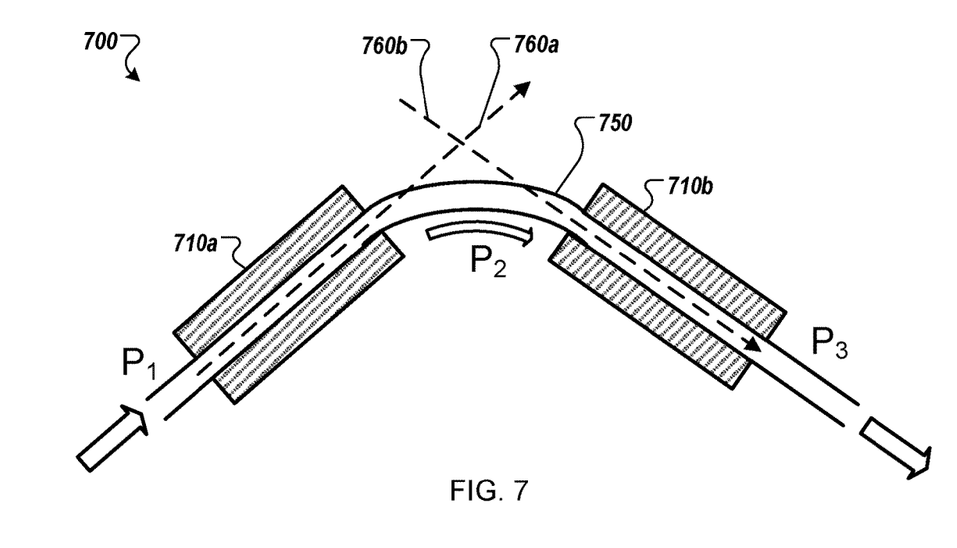
FIG. 7 is a cross-sectional view of another example arrangement of ultrasonic flowmeters, in accordance with some embodiments described in this document.

FIG. 7 is a cross-sectional view of an example arrangement 700 of ultrasonic flowmeters, in accordance with some embodiments described in this document. In some embodiments, the arrangement 700 can be used in place of the example USFMs 110, 210, and/or 310 of FIGS. 1-3.

The arrangement 700 includes a USFM 710a and a USFM 710b fluidically connected in series by a conduit 750 that is curved or otherwise nonlinear. A fluid flow enters the USFM 710a and is sonified by the USFM 710a. The sonification propagates along a path 760a that is substantially parallel to the direction of fluid flow through the USFM 710a. The fluid then flows through the curvature of the conduit 750 to the USFM 710b and is sonified again by the USFM 710b. The sonification propagates along a path 760b that is substantially parallel to the direction of fluid flow through the USFM 710b.

In some implementations, the arrangement 700 can provide a redundant configuration of USFMs. For example, a controller can compare the readings of the USFM 710a and the USFM 710b to perform averaging and/or to detect a difference that may be indicative of a malfunction of one or both of the USFMs 710a and 710b.

In order to prevent cross-propagation of sonification pulses from one of the USFMs 710a, 710b to the other (e.g., which may cause signal crosstalk, noise, or otherwise affect the measurements), the arrangement 700 is configured such that the path 760a is non-coaxial relative to the path 760b. In the illustrated example, the path 760a is non-parallel to the path 760b, however, and as such the conduit 750 does not provide a direct, coaxial path between the two USFMs 710a, 710b. A signal injected into the fluid by the USFM 710a propagates along the path 760a until it encounters the conduit 750. A substantial amount of the signal is attenuated by this junction, which reduces or substantially eliminates stray sonification signals from affecting the operations or the USFM 710b. Similarly, the arrangement 700 prevents sonification by the USFM 710b from affecting the operations of the USFM 710a.

Figure 8:
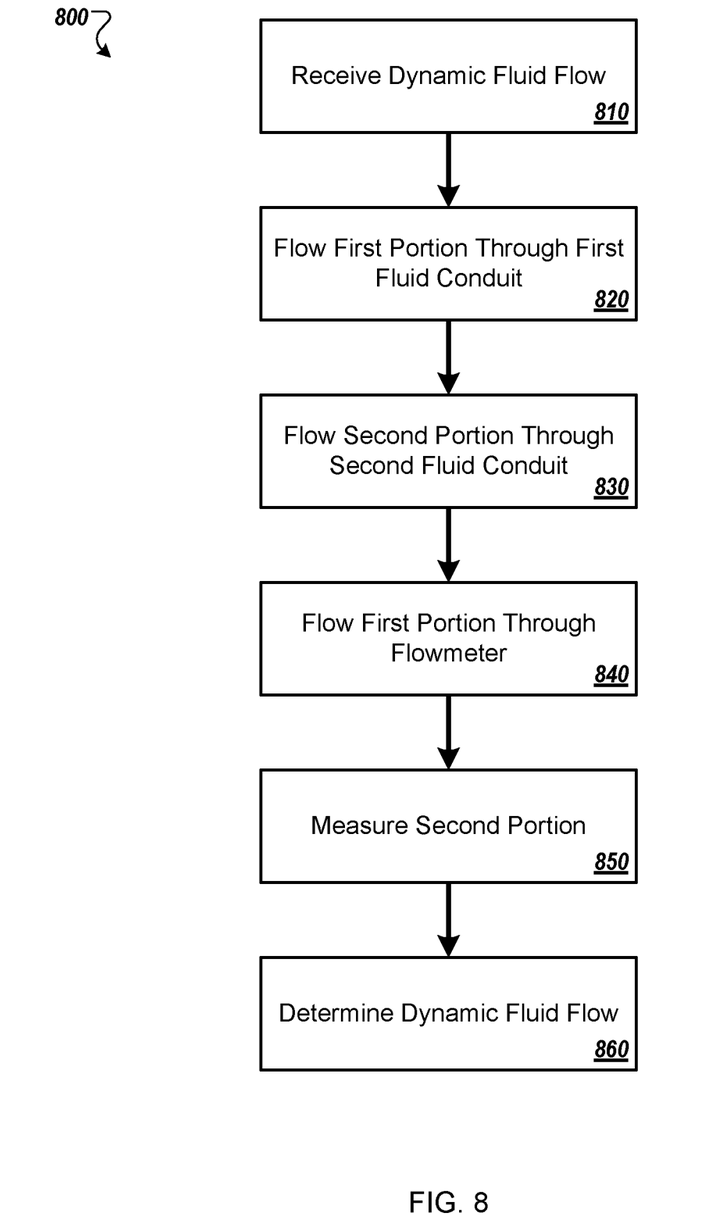
FIG. 8 is a flow diagram of an example process for measuring dynamic fluid flow using ultrasonic mass flow sensor systems, in accordance with some embodiments described in this document.

FIG. 8 is a flow diagram of an example process 800 for measuring dynamic fluid flow using ultrasonic mass flow sensor systems, in accordance with some embodiments described in this document. In some implementations, the process 800 can be used with the example systems 100, 200, or 300 of FIGS. 1-3, and with the example arrangements 400-700 of FIGS. 4-7. For example, the process 800 can be performed by the example controller 101, 201, or 301.

At 810, a dynamic fluid flow is received at an inlet. For example, a dynamic, time-varying flow of fluid can be received at the inlet 102.

At 820, a first portion of the dynamic fluid flow flows through a first fluid conduit configured with a first predetermined geometry and fluidically connected between the inlet and an outlet. For example, a portion of the fluid can flow through the venturi tube 150 along the path 106a to the outlet 104.

At 830, a second portion of the dynamic fluid flow flows through a second fluid conduit configured with a second predetermined geometry and fluidically connected between the inlet and an outlet. For example, another portion of the fluid can flow through along the path 106b and 106c to the USFM 110.

At 840, the second portion of the dynamic fluid flow flows through a first flow meter arranged along the second fluid conduit. For example, the fluid can flow along the path 106c through the USFM 110.

At 850, the second portion of the dynamic fluid flow is measured by the first flow meter. For example, the USFM 110 can sonify the path 106c to measure the fluid flow along the path 106c.

At 860, the dynamic fluid flow is determined based on the measuring. For example, the USFM 110 can provide measurement signals to the controller 101, and the controller 101 can determine the dynamic fluid flow based on the measurement signals.

In some implementations, determining, based on the measuring, the dynamic fluid flow can include determining at least one of a dynamic fluid flow volume or a dynamic fluid flow rate of the dynamic fluid flow based on the measuring of the second portion of the dynamic fluid flow, the first predetermined geometry, and the second predetermined geometry. For example, the flows along the path 106a and 106c will be substantially proportional based on the known flowable geometries of the venturi tube 150 and the USFM 110. The controller 101 can determine the fluid flow through the USFM 110, and based on that determination and the known flowable geometries of the venturi tube 150 and the USFM 110, determine the fluid flow along the path 106a based on the measured fluid flow along the path 106c.

In some implementations, the first predetermined geometry can be substantially the second predetermined geometry, and the second portion of the dynamic fluid flow is substantially equal to the first portion of the dynamic fluid flow. For example, in the system 200, the fluid conduit 211 can be configured to have substantially the same flowable geometry as each of the fluid conduits 251.

In some implementations, the first fluid conduit can include a collection of fluidically parallel additional fluid conduits each configured with a third predetermined geometry and fluidically connected between the inlet and the outlet, wherein flowing the second portion of the dynamic fluid flow through the second fluid conduit can also include flowing the second portion of the dynamic fluid flow as a collection of third portions of the dynamic fluid flow through the collection of fluidically parallel additional fluid conduits. For example, the fluid can flow through the system 200 from the inlet 202 to the outlet 204 though the USFM 210 and the collection of fluid conduits 251.

In some implementations, the third predetermined geometry can be substantially the second predetermined geometry. For example, in the system 200, the fluid conduit 211 has substantially the same flowable geometry as each of the fluid conduits 251.

In some implementations, a third portion of the dynamic fluid flow can flow through a third fluid conduit configured with a third predetermined geometry and fluidically connected between the inlet and the outlet, the third portion of the dynamic fluid flow can flow through a second flow meter arranged along the third fluid conduit, and the second flow meter can measure the third portion of the dynamic fluid flow. For example, in the example system 300, a portion of the fluid can flow along the paths 306a and 306b through the USFM 310. The USFM 310 can measure the dynamic fluid flow and provide measurement signals to the controller 301 for processing to determine a measurement based on the fluid flow through the USFM 310.

In some implementations, determining, based on the measuring, the dynamic fluid flow can include determining at least one of a dynamic fluid flow volume or a dynamic fluid flow rate of the dynamic fluid flow based on the measuring of the second portion of the dynamic fluid flow, the measuring of the third portion of the dynamic fluid flow, the first predetermined geometry, the second predetermined geometry, and the third predetermined geometry. For example, the controller 301 can receive measurement signals from the USFM 210 and the USFM 310, and determine a total fluid flow based on those measurements, and the known geometries of the fluid conduits 211, 311, and 251.

In some implementations, the third predetermined geometry can be substantially the second predetermined geometry. For example, the flowable geometry of the fluid conduit 311 can be the same as the flowable geometry of the fluid conduit 211 (e.g., the UFSM 210 and the USFM 310 can be two units of the same make and model of USFM).

In some implementations, the process 800 can also include flowing the second portion of the dynamic fluid flow through a second flow meter arranged along the second fluid conduit, and measuring, by the second flow meter, the second portion of the dynamic fluid flow, wherein determining, based on the measuring, the dynamic fluid flow can also include determining the dynamic fluid flow based on the measuring by the first flow meter and the second flow meter. For example, the fluid can flow through any of the example arrangements 400, 500, 600, and 700 in which the same portion of fluid flow can flow through two USFMs fluidically connected in a series arrangement.

In some implementations, the first fluid conduit can define a first fluid flow path, and flowing the second portion of the dynamic fluid flow through the second fluid conduit can also include flowing the second portion of the dynamic fluid flow along a second fluid flow path that is non-coaxial to the first fluid flow path, wherein the first portion of the second fluid conduit is non-coaxial to the second portion of the second fluid conduit. For example, each of the arrangements 400, 500, 600, and 700 includes two USFMs having non-coaxial sonification paths (e.g., the paths 460a, 560a, 660a, and 760a are non-coaxial to their companion paths 460b, 560b, 660b, and 760b).

Figure 9:
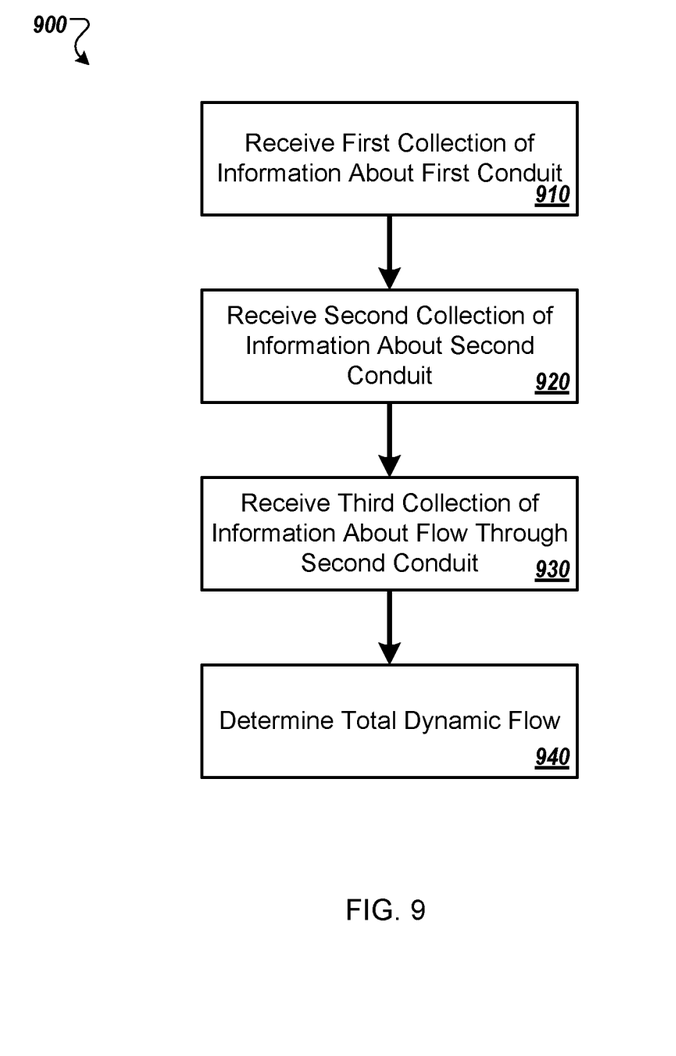
FIG. 9 is a flow diagram of another example process for measuring dynamic fluid flow using ultrasonic mass flow sensor systems, in accordance with some embodiments described in this document.

FIG. 9 is a flow diagram of an example process 900 for measuring dynamic fluid flow using ultrasonic mass flow sensor systems, in accordance with some embodiments described in this document. In some implementations, the process 900 can be used with the example systems 100, 200, or 300 of FIGS. 1-3, and with the example arrangements 400-700 of FIGS. 4-7. For example, the process 900 can be performed by the example controller 101, 201, or 301.

At 910, a first collection of information descriptive of a first geometry of a first fluid conduit is received. For example, the example controller 101 can be configured or calibrated with information that describes the flowable geometry of the example venturi tube 150.

At 920, a second collection of information descriptive of a second geometry of a second fluid conduit is received, wherein the first fluid conduit and the second fluid conduit together flow a total dynamic fluid flow path. For example, the controller 101 can be configured or calibrated with information that describes the flowable geometry of the example USFM 110. The flowable areas of the USFM 110 and the venturi tube 150 combine to form a total dynamic fluid flow path.

At 930, a third collection of information descriptive of a partial dynamic fluid flow through the second fluid conduit is received. For example, the USFM 110 can provide measurement signals representative of the dynamic fluid flow though the USFM 110 can be provided to the controller 110 for processing.

At 940, a total dynamic fluid flow is determined based on the first collection of information, the second collection of information, and the third collection of information. For example, the controller 110 can determine a total dynamic flow through the system 100 based on the known flowable geometries of the venturi tube 150 and the USFM 110, and the measurement information provided by the USFM 110.

In some implementations, the first fluid conduit can include a collection of fluidically parallel additional fluid conduits each configured with substantially the second geometry, wherein the partial dynamic fluid flow through the second fluid conduit is substantially the same as other partial dynamic fluid flows in each of the collection of fluidically parallel additional fluid conduits. For example, the example fluid conduits 251 can be configured with substantially the same flowable geometry as the fluid conduit 211.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fluid flow measurement apparatus, comprising:
an inlet configured to flow a dynamic fluid flow;
an outlet configured to flow the dynamic fluid flow;
a first fluid conduit fluidically connected between the inlet and the outlet, configured with a first predetermined geometry having a first length and a first cross-section, and configured to flow a first portion of the dynamic fluid flow;
a second fluid conduit fluidically connected between the inlet and the outlet, configured with a second predetermined geometry having a second length substantially the same as the first length and a second cross-section that is substantially the same as the first cross-section, and configured to flow a second portion of the dynamic fluid flow such that a dynamic behavior of second portion is representative of a dynamic behavior of the first portion; and
a first flow meter configured to measure the second portion of the dynamic fluid flow.

2. The fluid flow measurement apparatus of claim 1, wherein the first flow meter is a transit-time type ultrasonic flow meter.

3. The fluid flow measurement apparatus of claim 1, further comprising an electronic circuit configured to determine at least one of a dynamic fluid flow volume or a dynamic fluid flow rate of the dynamic fluid flow based on a measurement of the second portion of the dynamic fluid flow, the first predetermined geometry, and the second predetermined geometry.

4. The fluid flow measurement apparatus of claim 1, wherein the first fluid conduit comprises a plurality of fluidically parallel additional fluid conduits each configured with a third predetermined geometry.

5. The fluid flow measurement apparatus of claim 4, wherein the third predetermined geometry comprises a third length and a third cross-section that are substantially the same as the second length and the second cross-section of the second predetermined geometry such that the dynamic behavior of the second portion is representative of the dynamic behavior of the first portion.

6. The fluid flow measurement apparatus of claim 1, further comprising:
a third fluid conduit fluidically connected between the inlet and the outlet, configured with a third predetermined geometry having a third length and a third cross-section, and configured to flow a third portion of the dynamic fluid flow such that a dynamic behavior of third portion is representative of a dynamic behavior of the first portion; and
a second flow meter configured to measure the third portion of the dynamic fluid flow.

7. The fluid flow measurement apparatus of claim 6, further comprising an electronic circuit configured to determine at least one of a dynamic fluid flow volume or a dynamic fluid flow rate of the dynamic fluid flow based on a measurement of the third portion of the dynamic fluid flow, the first predetermined geometry, the second predetermined geometry, and the third predetermined geometry.

8. The fluid flow measurement apparatus of claim 1, further comprising a second flow meter configured to measure the second portion of the dynamic fluid flow in a first portion of the second fluid conduit, wherein the first flow meter is configured to measure the second portion of the dynamic fluid flow in a second portion of the second fluid conduit apart from the first portion of the second fluid conduit.

9. The fluid flow measurement apparatus of claim 8, further comprising a fluid interconnection that is non-coaxial to at least one of the first portion of the second fluid conduit and the second portion of the second fluid conduit.

10. A method of sensing flow, the method comprising:
receiving a dynamic fluid flow at an inlet;
flowing a first portion of the dynamic fluid flow through a first fluid conduit configured with a first predetermined geometry having a first length and a first cross-section and fluidically connected between the inlet and an outlet;

flowing a second portion of the dynamic fluid flow through a second fluid conduit configured with a second predetermined geometry having a second length substantially the same as the first length and a second cross-section that is substantially the same as the first cross-section and fluidically connected between the inlet and an outlet such that a dynamic behavior of second portion is representative of a dynamic behavior of the first portion;

flowing the second portion of the dynamic fluid flow through a first flow meter arranged along the second fluid conduit;

measuring, by the first flow meter, the second portion of the dynamic fluid flow; and determining, based on the measuring, the dynamic fluid flow.

11. The method of claim 10, wherein determining, based on the measuring, the dynamic fluid flow comprises determining at least one of a dynamic fluid flow volume or a dynamic fluid flow rate of the dynamic fluid flow based on the measuring of the second portion of the dynamic fluid flow, the first predetermined geometry, and the second predetermined geometry.

12. The method of claim 10, wherein the first fluid conduit comprises a plurality of fluidically parallel additional fluid conduits each configured with a third predetermined geometry and fluidically connected between the inlet and the outlet, wherein flowing the second portion of the dynamic fluid flow through the second fluid conduit further comprises flowing the second portion of the dynamic fluid flow through the second fluid conduit as a plurality of third portions of the dynamic fluid flow through the plurality of fluidically parallel additional fluid conduits.

13. The method of claim 12, wherein the third predetermined geometry comprises a third length and a third cross-section that are substantially the same as the second length and the second cross-section of the second predetermined geometry such that the dynamic behavior of second portion is representative of the dynamic behavior of the first portion.

14. The method of claim 10, further comprising:
flowing a third portion of the dynamic fluid flow through a third fluid conduit configured with a third predetermined geometry having a third length and a third cross-section, and fluidically connected between the inlet and the outlet;

flowing the third portion of the dynamic fluid flow through a second flow meter arranged along the third fluid conduit such that a dynamic behavior of third portion is representative of a dynamic behavior of the first portion; and measuring, by the second flow meter, the third portion of the dynamic fluid flow.

15. The method of claim 14, wherein determining, based on the measuring, the dynamic fluid flow comprises determining at least one of a dynamic fluid flow volume or a dynamic fluid flow rate of the dynamic fluid flow based on the measuring of the second portion of the dynamic fluid flow, the measuring of the third portion of the dynamic fluid flow, the first predetermined geometry, the second predetermined geometry, and the third predetermined geometry.

16. The method of claim 10, further comprising:
flowing the second portion of the dynamic fluid flow through a second flow meter arranged along the second fluid conduit; and measuring, by the second flow meter, the second portion of the dynamic fluid flow;

wherein determining, based on the measuring, the dynamic fluid flow further comprises determining the dynamic fluid flow based on the measuring by the first flow meter and the second flow meter.

17. The method of claim 16, wherein the first fluid conduit defines a first fluid flow path, and flowing the second portion of the dynamic fluid flow through the second fluid conduit further comprises flowing the second portion of the dynamic fluid flow along a second fluid flow path that is non-coaxial to the first fluid flow path, wherein the first portion of the second fluid conduit is non-coaxial to the second portion of the second fluid conduit.

* * * * *